(12) United States Patent
Kopri et al.

(10) Patent No.: US 9,319,285 B2
(45) Date of Patent: Apr. 19, 2016

(54) OPTIMIZING PARTITION PLACEMENT IN VIRTUALIZED ENVIRONMENTS

(71) Applicant: Unisys Corporation, Blue Bell, PA (US)

(72) Inventors: Nandish Kopri, Bangalore (IN); Dharmesh Kakadia, Hyderabad (IN)

(73) Assignee: Unisys Corporation, Blue Bell, PA (US)

( * ) Notice: Subject to any disclaimer, the term of this patent is extended or adjusted under 35 U.S.C. 154(b) by 486 days.

(21) Appl. No.: 13/710,918

(22) Filed: Dec. 11, 2012

(65) Prior Publication Data

US 2014/0136688 A1    May 15, 2014

(51) Int. Cl.
*G06F 15/173*     (2006.01)
*H04L 12/26*      (2006.01)

(52) U.S. Cl.
CPC ............ *H04L 43/04* (2013.01); *H04L 43/0858* (2013.01)

(58) Field of Classification Search
CPC . G06F 9/5077; G06F 9/45558; G06F 9/5088; G06F 9/4856
See application file for complete search history.

(56) References Cited

U.S. PATENT DOCUMENTS

| | | | |
|---|---|---|---|
| 2006/0230407 A1* | 10/2006 | Rosu et al. | 718/105 |
| 2010/0027420 A1* | 2/2010 | Smith | 370/235 |
| 2011/0225277 A1* | 9/2011 | Freimuth et al. | 709/223 |
| 2011/0282986 A1* | 11/2011 | Phaal | 709/224 |
| 2012/0054367 A1* | 3/2012 | Ramakrishnan et al. | 709/242 |
| 2012/0331147 A1* | 12/2012 | Dutta et al. | 709/226 |
| 2013/0166749 A1* | 6/2013 | Kruglick | 709/226 |
| 2013/0294228 A1* | 11/2013 | Ahuja et al. | 370/228 |
| 2013/0304899 A1* | 11/2013 | Winkler | 709/224 |
| 2013/0304907 A1* | 11/2013 | Saxena et al. | 709/224 |

* cited by examiner

*Primary Examiner* — Brian J Gillis
*Assistant Examiner* — Austin Moreau
(74) *Attorney, Agent, or Firm* — Robert P. Marley (57) ABSTRACT

Application performance in cloud-based virtualized environments may be improved by migrating partitions executing within the cloud between servers. When an application spans multiple related partitions spread out on different servers within the cloud, related partitions may be migrated to the same server or nearby servers to reduce input/output (I/O) delay in communications between the related partitions. A method for improving performance may include analyzing a network traffic log to identify related partitions. Then, communications costs may be calculated for the related partitions and a partition selected for migration to a new location in the cloud.

20 Claims, 7 Drawing Sheets

OPTIMIZING PARTITION PLACEMENT IN VIRTUALIZED ENVIRONMENTS

FIELD OF THE DISCLOSURE

The instant disclosure relates to computer networks. More specifically, this disclosure relates to organizing virtualized environments within computer networks.

BACKGROUND

Virtualization allows a computer system to host different environments for executing applications. The virtual environments may allow applications to be isolated and/or allow hardware to be emulated. Virtualization is useful for allowing the execution of computer software written for a different type of hardware than present in the computer system hosting the virtualized environments. Virtual environments may be hosted in partitions that span multiple processors in a computer system, span multiple computer systems in a data center, and span multiple geographically-disparate datacenters. A partition may execute, for example, applications within a WINDOWS or Linux operating system image.

The images may communicate with each other through a logical interconnect fabric. The fabric provides a communication path for partitions with different relationships. For example, partitions may be adjacent when both partitions are hosted on the same server. Partitions may be co-located when partitions are on different servers within the same data center. Partitions may be geographically dispersed when partitions are geographically separated.

Conventionally, the choice of media and physical communications characteristics for a pair of partitions is resolved astronomically at run-time to determine the optimal communications channel, whether the partitions are adjacent, collocated or geographically dispersed. When the software components are in either the same partition or in multiple partitions on the same computer system the interconnect allows communication between these images across a shared-memory transport. Software components located in partitions, on different computer systems utilize a wire interconnect.

Cloud computing has enabled many enterprise applications to move to the cloud. But for performance critical applications, the input/output (I/O) waiting time of sending data to and from the cloud can unacceptably reduce performance. Data analysis applications, and other data-intensive applications, create increased traffic between computer systems. For example, data may be stored on a first computer system and accessed and processed on a second computer system. When the data storage and data processing applications execute on different partitions, significant amount of data may be exchanged that can lead to increased I/O waiting time. The I/O waiting time is particularly pronounced when the partitions are located on different servers and/or in different data centers.

Figure 1:
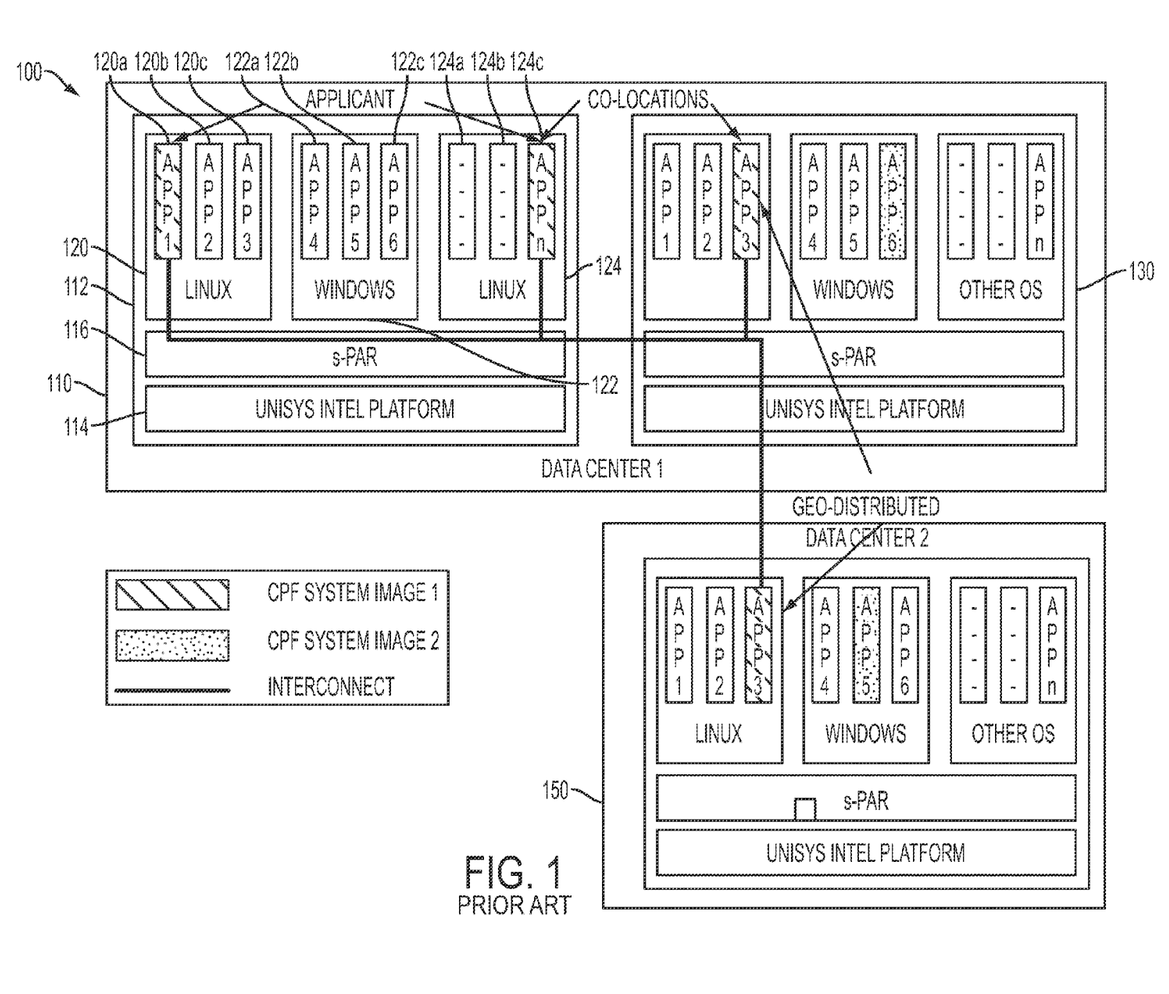
FIG. 1 is a block diagram of a conventional distribution of applications in virtualized environments.

FIG. 1 is a block diagram of a conventional distribution of applications in virtualized environments. A first data center 110 may include a server 112 having an Intel-based hardware platform 114. A partition manager 116 executes on the hardware platform 114, which executes several partitions 120, 122, and 124. The partitions 120, 122, and 124 may execute different operating systems within virtualized environments and share data through shared memory in the hardware platform 114 through control of the partition manager 116. Within each of the partitions 120, 122, and 124, applications 120a-b, 122a-c, and 124a-c may execute, respectively. Server 130 may also be part of the data center 110 and be configured similar to the server 110. A second data center 150 may be similarly configured to the first data center 110 and may be located at a different location than the first data center 110.

System images may span one or more partitions. For example, a first system image may include the application 120a, the application 124c, an application executing in the second server 130 and an application executing in the second data center 150. In another example, a second system image may include an application executing in the second server 130 and an application executing in the second data center 150. Interconnects between the server 120 and the server 130 and between the first data center 110 and the second data center 150 may allow data to be shared between partitions on different servers and different data centers. The interconnect may be, for example, a network connection, such as an Ethernet connection.

Although the interconnect provides a communication channel between computer systems, the communication delay depends on how partitions are placed within the different computer systems. For example, shared memory is a much faster communication path than the interconnect. Conventionally, there is no attention to how partitions are placed across computer systems. As a result, the partitions may be scattered around in a data center or even across data centers. The lack of organization may lead to unnecessary use of the slower interconnect communication path, which reduces performance of the applications, rather than the faster shared-memory communications path.

SUMMARY

Performance of applications executing in cloud-based virtual environments may be improved by migrating partitions belonging to a single system image to reduce communications delay. For example, all partitions of a system image may be positioned within the cloud such that shared memory is used by each of the partitions to communicate with each of the other partitions belonging to the system image. In another example, partitions of a system image may be migrated within the cloud to reduce communications cost due to use of interconnects.

Within a computer system, partitions may be started and stopped based on a number of factors, such as load, availability, and unexpected errors. The location of each partition of a system image may be identified by analyzing the network traffic between the partitions. For example, when significant communications occurs between two partitions, it may be determined that the partitions are related, such as when the partitions are members of the same system image. In another example, when communications are sparse, but a large percentage of the total bytes communicated from a partition are to another partition, the partitions may be determined to be related. Partitions may be related, such as when they are members of the same system image.

According to one embodiment, a method includes receiving a network traffic log listing communications between a plurality of partitions spanning a first server and a second server. The method also includes identifying, from the network traffic log, a first partition and a second partition of the plurality of partitions that belong to a first system image.

According to another embodiment, a computer program product includes a non-transitory computer readable medium having code to receive a network traffic log listing communications between a plurality of partitions spanning a first server and a second server. The medium further comprises code to identify, from the network traffic log, a first partition and a second partition of the plurality of partitions that belong to a first system image.

According to yet another embodiment, an apparatus includes a memory and a processor coupled to the memory. The processor is configured to receive a network traffic log listing communications between a plurality of partitions spanning a first server and a second server. The processor is further configured to identify, from the network traffic log, a first partition and a second partition of the plurality of partitions that belong to a first system image.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 2:
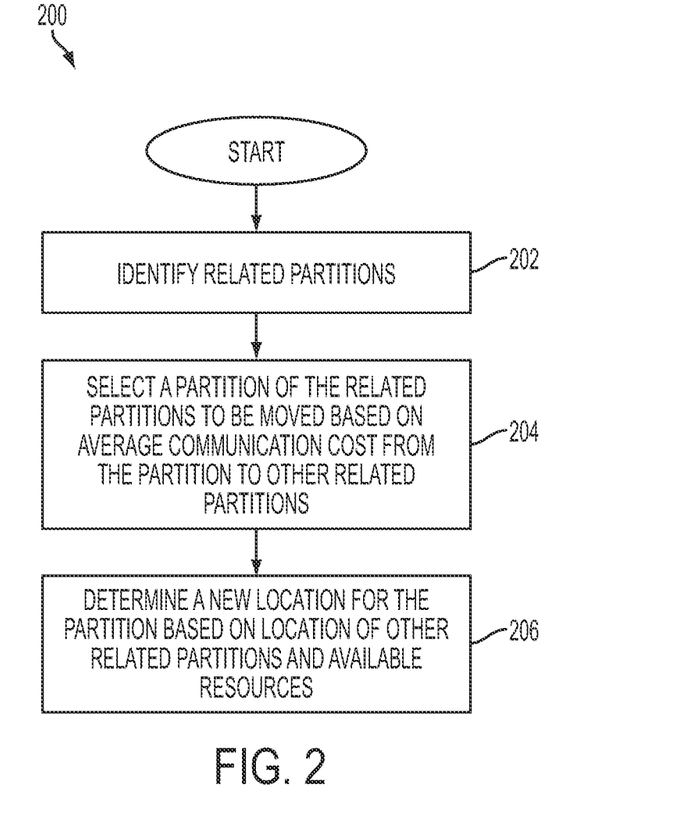
FIG. 2 is a flow chart illustrating a method of improving performance of applications executing in virtualized environments by migrating partitions between servers according to one embodiment of the disclosure.

FIG. 2 is a flow chart illustrating a method of improving performance of applications executing in virtualized environments by migrating partitions between servers according to one embodiment of the disclosure. A method 200 begins at block 202 with identifying related partitions within a cloud of virtualized environments. Related partitions may be partitions that are members of the same system image.

When identifying related partitions, a logical communications cost may be calculated between each of the partitions. An access matrix may be calculated in which each entry in the matrix is the communications cost between two partitions. For example, when three partitions are related, the access matrix may be a three by three matrix. A diagonal through the matrix, where i=j, may be zeroes, because there is no cost for a partition to communicate with itself.

$$AccessMatrix = \begin{bmatrix} 0 & c12 & c13 \\ c21 & 0 & c23 \\ c31 & c32 & 0 \end{bmatrix}$$

Each element of the access matrix may be calculated as:

$cij$=(Access Rate)(Access Delay Between Partitions), where cij represents logical communication cost between partition i and partition j. A high logical cost may indicate high access rate, long delay, or both. The delay may be high due to a longer distance between two partitions or saturation of the interconnect between two partitions.

At block 204, a partition is selected from the related partitions to be moved to a new location. The partition may be selected based, in part, on an average communications cost from the partition to other related partitions. An aggregate cost may be calculated by computing a mean of the communication costs a partition incurs to communicate with all other related partitions. For example, an average communications cost for a first partition may be calculated as $$C1 = \frac{c12 + c13}{2}.$$

The average cost is, thus, the sum of the logical communication costs computed above at block 202 divided by one less than the number of partitions. Alternatively, the average cost for each partition may be calculated by summing the rows of the AccessMatrix computed above and dividing by one less than the number of partitions to obtain a n×1 CostMatrix, where n is the number of related partitions at block 202. A partition with the highest average communication cost may be selected for migration to a new location.

Figure 3:
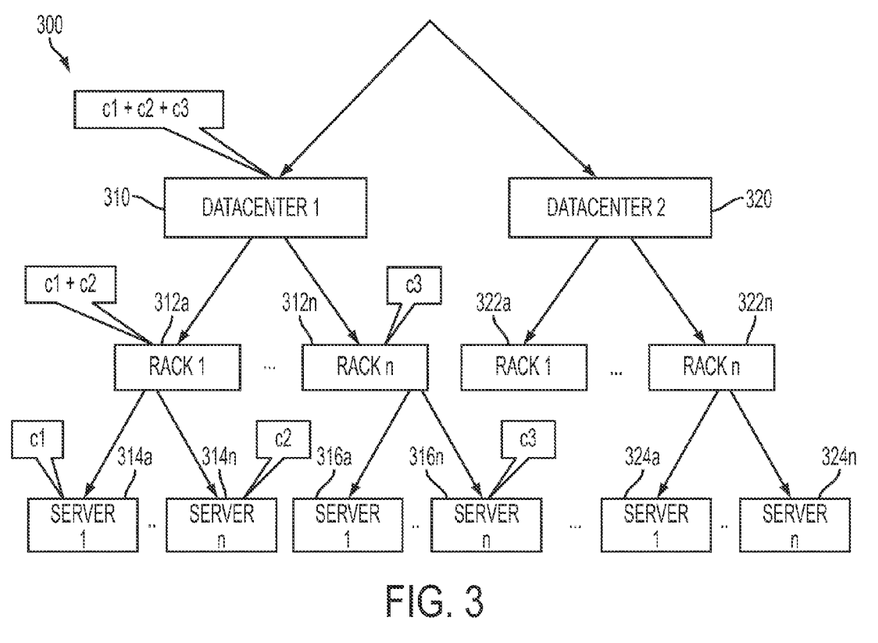
FIG. 3 is a block diagram illustrating a hierarchical arrangement of servers in a cloud according to one embodiment.

At block 206, a new location is determined for the partition selected at block 204. The new location may be selected based, in part, on the location of other related partitions and available resources of servers in the cloud. According to one embodiment, the new location may be selected through a hierarchical approach. FIG. 3 is a block diagram illustrating a hierarchical arrangement of servers in a cloud according to one embodiment. A hierarchy 300 may include datacenters 310 and 320. The datacenter 310 may include a number of racks 312a-312n, in which each of the racks 312a-312n includes servers. For example, the rack 312a may include servers 314a-314n, and the rack 312n may include servers 316a-316n. Likewise, the datacenter 320 may include racks 322a-322n, in which the rack 322n includes servers 324a-324n.

The hierarchy 300 may be constructed using network traffic information. Each node in the communication tree may represent the communication cost to that entity, whether the node is a datacenter, a rack, or a server. Each parent node aggregates the cost of all children nodes. For example, the server node cost may be calculated from the access matrix of block 202 as Value(Parent)=ΣValue(Child).

After the hierarchy 300 is populated, the hierarchy 300 may be traversed from a root node to leaf nodes, each time selecting the branch with the largest cost. The leaf node reached after traversal may be selected as a destination for the partition. The partition may then be moved to the server represented by that leaf node.

If the selected server does not have resources to execute the partition, other server nodes in a similar position of the hierarchy 300 may be selected for executing the partition. If again no servers have resources available to execute the partition, the process may be continued recursively.

For example, a system image may include four partitions assigned on different servers. A first partition of the system image may be executing on the server 314a, a second partition of the system image may be executing on server 314n, and a third partition of the system image may be executing on the server 316n. A new location for a fourth partition may be determined by computing costs for each of the nodes of the hierarchy 300, such as costs c1, c2, and c3. Because the fourth partition is related to the first, second, and third partition, the selection procedure will favor the datacenter 310 over the datacenter 320, because the cost associated with the datacenter 310 is higher. That is, the cost for datacenter 310 is c1+c2+c3 from values calculated above at block 204, whereas the cost for the datacenter 320 is zero. Similarly, the selection procedure may select the rack 312a or the rack 312n, depending on whether (c1+c2) or c3 is larger. Further, if the rack 312a is selected, then the server 314a or the server 314n may be selected depending on whether c1 or c2 is larger.

If the server 314n is selected, but the server 314n does not have resources to host the fourth partition, then the server 314a may be selected. If the server 314a is not available to host the fourth partition, then another server in the rack 312a may be selected, such as a server 314b (not shown). If none of the resources of the rack 312a are available to host the fourth partition, then a recursive procedure may continue to search the hierarchy 300 for a new location for the fourth partition. For example, the procedure may select a server attached to one of the racks 312b-312n with the highest cost. After the partition is moved to a new server, the benefits of migration may be determined by repeating the calculations of blocks 202 and 204.

Although a process of migrating partitions in a cloud-based virtualized environment is described above with reference to FIG. 3, the method may also be applied to decide where to start a new partition. For example, if the demand handled by a system image increases beyond the system image's capacity, a new partition may be started to increase the capacity of the system image. Placement of that partition may be determined by calculating costs and selected a server to minimize communications delay as described above.

Figure 4:
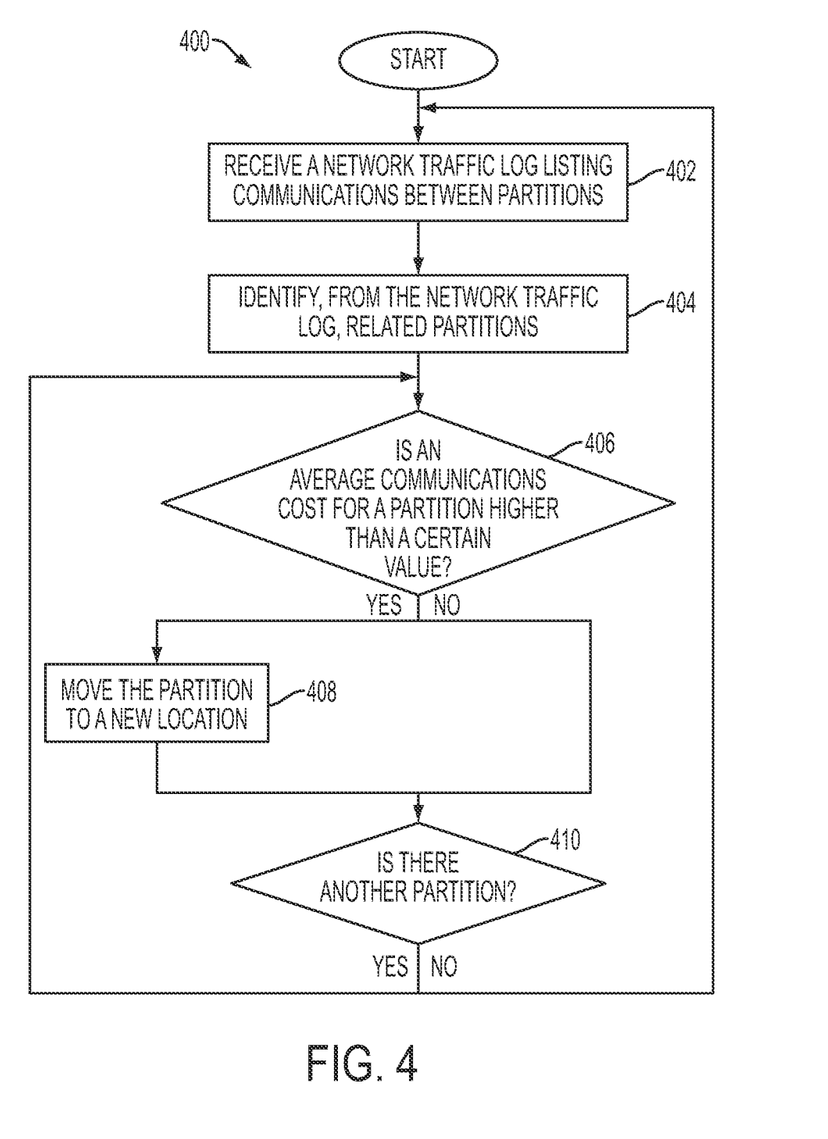
FIG. 4 is a flow chart illustrating a method of analyzing network logs to determine locations for migrating partitions in a cloud of virtualized environments according to one embodiment of the disclosure.

According to one embodiment, migration of a partition in a system image from one server to another server may be directed by a designated server within the hierarchy 300. FIG. 4 is a flow chart illustrating a method of analyzing network logs to determine locations for migrating partitions in a cloud of virtualized environments according to one embodiment of the disclosure. A method 400 begins at block 402 with receiving a network traffic log listing communications between partitions in a cloud-based virtualized environment. At block 404, related partitions are identified from the network traffic log. For example, partitions may be identified as related based on calculating communications costs. In another example, related partitions may be identified based on a naming scheme or address scheme. If the host name of all related partitions start with "D1," then the related partitions may be selected from the logged host name. If the network address, such as an Internet protocol (IP) address, is in subnet 192.168.0.x, then the related partitions may be selected from the log based on source address and/or destination address.

At block 406, it is determined whether an average communications cost for a partition is higher than a certain value. The average communications cost may be computed as described above with reference to FIG. 2. The average communications cost may also be calculated based on other criteria, such as a ping time and/or a maximum throughput. If the average communications cost is higher than a certain value at block 406, then the partition is moved to a new location at block 408. A new location may be selected based on the method described above with reference to FIG. 2. If the average communications cost is lower than the value at block 406, then the partition may not be moved. Other criteria may be used to determine whether to move the partition to a new location at block 408. For example, block 406 may consider whether an expected benefit, such as reduced communication cost, of moving the partition would exceed a minimum gain. If the benefit from moving the partition is too small, the partition may not be moved at block 408.

At block 410, it is determined whether there is another partition with an average communication cost higher than a certain value. If so, the method 400 returns to block 406. The method may repeat blocks 406, 408, and 410 to evaluate each partition identified in the network traffic log. If no further partitions exist at block 410, then the method may return to block 402 to continue analyzing network traffic logs until another opportunity to move a partition to a new location occurs.

The method described above in FIG. 2 and FIG. 4 for relocating a partition may also be adapted to reduce other constraints on partition placements that may arise due to, for example, high availability and/or disaster recovery. The identified partitions of a system image may be considered an affine group in other operations, such as service replication, maintenance, and/or migration.

Through intelligent placement of partitions, the interconnect traffic may be reduced significantly, which reduces I/O delay times experienced by an application executing in a system image. The improved performance may allow scaling the interconnect to a much larger number of servers, reducing the management burden on administrators, better utilizing available servers in the cloud to allow fewer partitions and/or servers to be used, and improving performance of other applications executing in the cloud by freeing interconnect resources to reduce contention for interconnect bandwidth.

Figure 5:
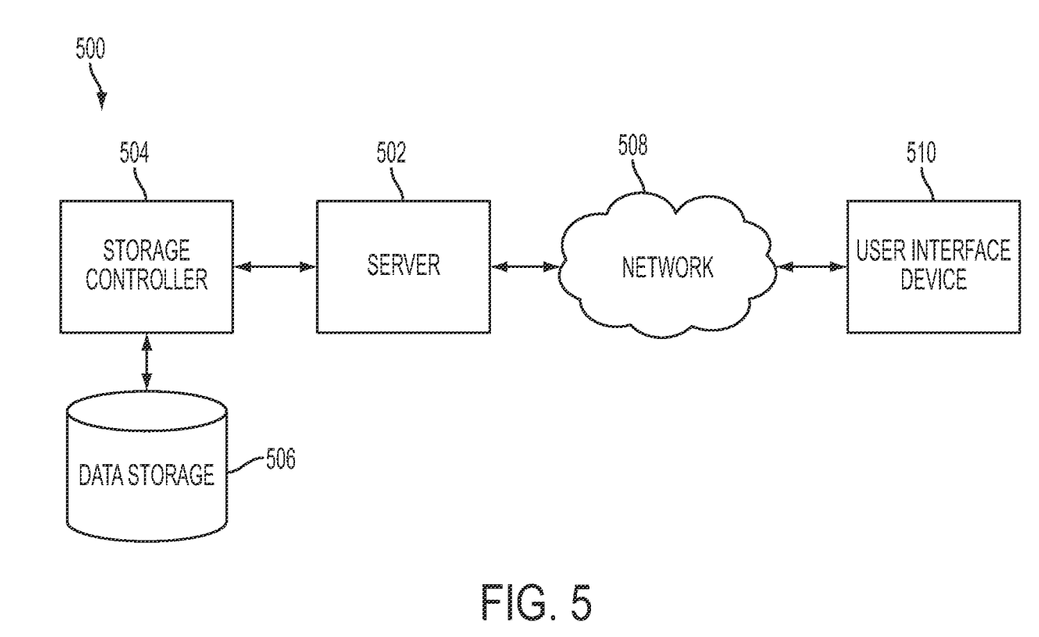
FIG. 5 is a block diagram illustrating a computer network according to one embodiment of the disclosure.

FIG. 5 illustrates one embodiment of a system 500 for an information system, including a system for hosting applications in virtualized environments. The system 500 may include a server 502, a data storage device 506, a network 508, and a user interface device 510. The server 502 may be a dedicated server or one server in a cloud computing system. The server 502 may also be a hypervisor-based system executing one or more guest partitions. In a further embodiment, the system 500 may include a storage controller 504, or storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other a mobile communication device having access to the network 508. When the device 510 is a mobile device, sensors (not shown), such as a camera or accelerometer, may be embedded in the device 510. When the device 510 is a desktop computer the sensors may be embedded in an attachment (not shown) to the device 510. In a further embodiment, the user interface device 510 may access the Internet or other wide area or local area network to access a web application or web service hosted by the server 502 and provide a user interface for enabling a user to enter or receive information.

The network 508 may facilitate communications of data, such as deployment packages, between the server 502 and the user interface device 510. The network 508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 510 accesses the server 502 through an intermediate sever (not shown). For example, in a cloud application the user interface device 510 may access an application server. The application server may fulfill requests from the user interface device 510 by accessing a database management system (DBMS). In this embodiment, the user interface device 510 may be a computer or phone executing a Java application making requests to a JBOSS server executing on a Linux server, which fulfills the requests by accessing a relational database management system (RDMS) on a mainframe server.

Figure 6:
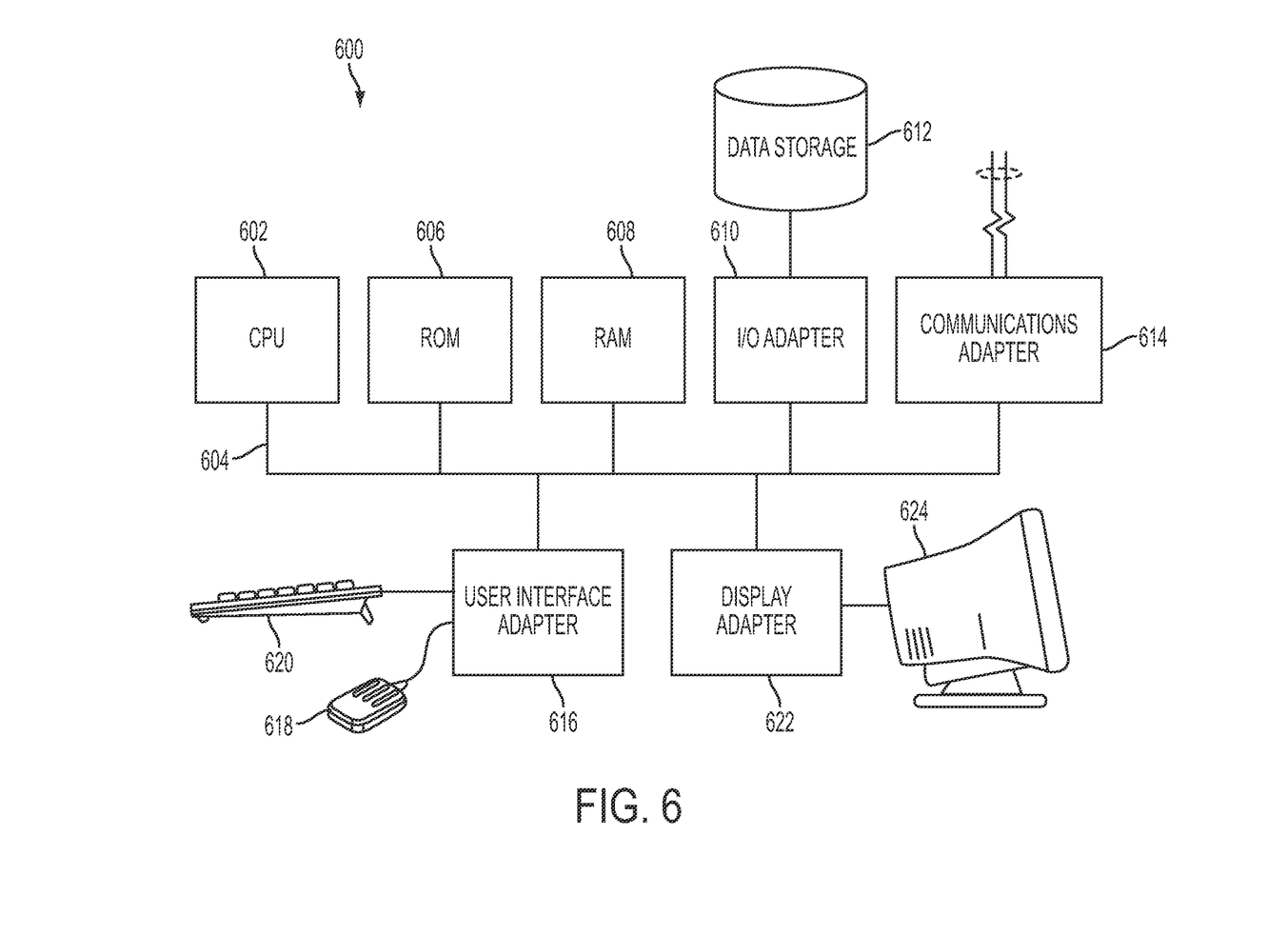
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 508, which may be one or more of a LAN, WAN, and/or the Internet. The communications adapter 614 may also be adapted to couple the computer system 600 to other networks such as a global positioning system (GPS) or a Bluetooth network. The user interface adapter 616 couples user input devices, such as a keyboard 620, a pointing device 618, and/or a touch screen (not shown) to the computer system 600. The keyboard 620 may be an on-screen keyboard displayed on a touch panel. Additional devices (not shown) such as a camera, microphone, video camera, accelerometer, compass, and or gyroscope may be coupled to the user interface adapter 616. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of the server 502 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

Figure 7A:
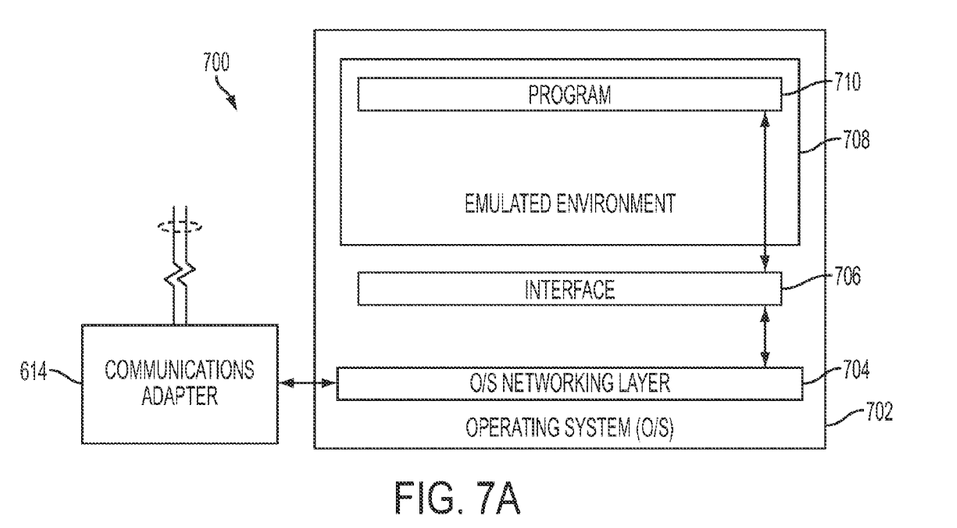
FIG. 7A is a block diagram illustrating a server hosting an emulated software environment for virtualization according to one embodiment of the disclosure.

FIG. 7A is a block diagram illustrating a server hosting an emulated software environment for virtualization according to one embodiment of the disclosure. An operating system 702 executing on a server includes drivers for accessing hardware components, such as a networking layer 704 for accessing the communications adapter 614. The operating system 702 may be, for example, Linux. An emulated environment 708 in the operating system 702 executes a program 710, such as CPCommOS. The program 710 accesses the networking layer 704 of the operating system 702 through a non-emulated interface 706, such as XNIOP. The non-emulated interface 706 translates requests from the program 710 executing in the emulated environment 708 for the networking layer 704 of the operating system 702.

Figure 7B:
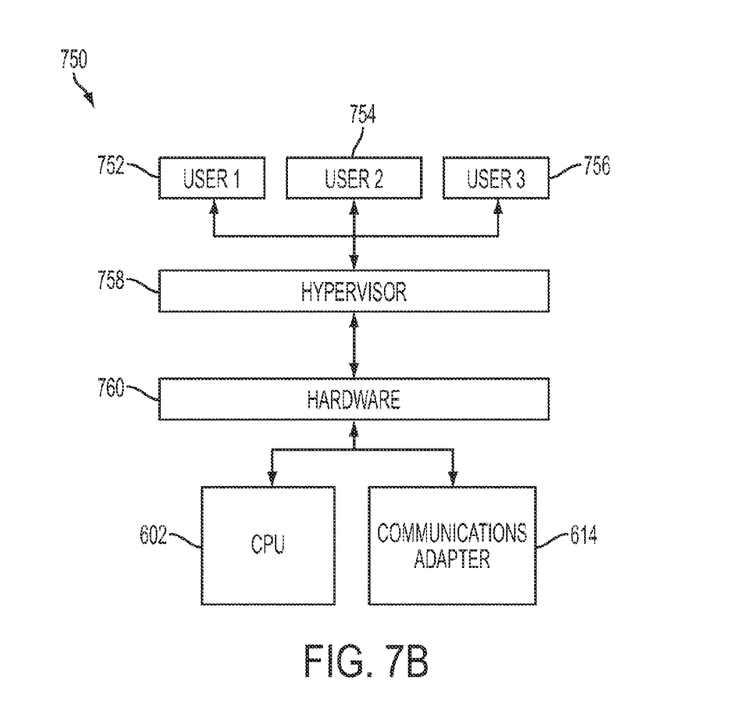
FIG. 7B is a block diagram illustrating a server hosting an emulated hardware environment according to one embodiment of the disclosure.

In another example, hardware in a computer system may be virtualized through a hyervisor. FIG. 7B is a block diagram illustrating a server hosing an emulated hardware environment according to one embodiment of the disclosure. Users 752, 754, 756 may access the hardware 760 through a hypervisor 758. The hypervisor 758 may be integrated with the hardware 760 to provide virtualization of the hardware 760 without an operating system, such as in the configuration illustrated in FIG. 7A. The hypervisor 758 may provide access to the hardware 760, including the CPU 602 and the communications adaptor 614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    receiving, by a migration server, a network traffic log listing communications between a plurality of partitions spanning a first server and a second server, wherein the second server comprises a memory; and
    identifying, by the migration server, from the network traffic log, a set of related partitions based on a set of criteria, wherein the plurality of partitions comprises the set of related partitions, wherein the set of related partitions comprises a first partition and a second partition related to each other based on the set of criteria, wherein the first partition and the second partition belong to a same system image, wherein the first partition is hosted on the first server, wherein the second partition is hosted on the second server, where the set of criteria is stored on the migration server;
    performing a first determination, by the migration server, of a first average communication cost for the first partition and a second average communication cost for the second partition, wherein the first average communication cost is based on the first partition communicating with the set of related partitions, wherein the second average communication cost is based on the second partition communication with the set of related partitions;
    selecting, by the migration server, the first partition over the second partition based on the first average communication cost being greater than the second average communication cost;
    performing a second determination, by the migration server, based on the selecting, of a new location for the first partition in a hierarchical network tree, wherein the hierarchical network tree comprises a root node, a plurality of parent nodes dependent from the root node, and a plurality of children nodes dependent from the parent nodes, wherein the children nodes comprise the first server and the second server, wherein the second server comprises the new location, wherein each node of the hierarchical network tree represents a communication cost to that respective node, wherein each of the parent nodes aggregates a cost of all of the children nodes for that parent node, wherein the second determination comprises a traversal of the hierarchical network tree from the root node to the children nodes and a selection, based on the traversal, of a branch of the hierarchical network tree with a largest cost, wherein a parent node from the parent nodes comprises the cost which comprises the first average communication cost;
    moving, by the migration server, based on the hierarchical network tree, the first partition from the first server to the new location on the second server based on the second average communication cost being less than the first average communication cost such that the first partition and the second partition share the memory.

2. The method of claim 1, further comprising:
    calculating an average cost for communications between the first partition located on the first server and the second partition located on the second server; and
    selecting, based on the average cost, the first partition for migration from the first server to the second server.

3. The method of claim 2, in which calculating the average cost comprises calculating a mean of communications costs between the first partition and each other partition of the plurality of partitions.

4. The method of claim 3, in which calculating the average cost comprises determining an input/output delay between the first partition and each of the other partitions of the plurality of partitions.

5. The method of claim 1, in which the first server is a member of a first rack and the second server is a member of a second rack.

6. The method of claim 5, in which the first server is a member of a first data center and the second server is a member of a second data center.

7. The method of claim 1, further comprising:
    capturing network traffic between the plurality of partitions; and
    storing the captured network traffic in the network traffic log before analyzing the network traffic.

8. A computer program product, comprising:
    a non-transitory computer readable medium comprising:
        code to receive, by a migration server, a network traffic log listing communications between a plurality of partitions spanning a first server and a second server, wherein the second server comprises a memory; and
        code to identify, by the migration server, from the network traffic log, a set of related partitions based on a set of criteria, wherein the plurality of partitions comprises the set of related partitions, wherein the set of related partitions comprises a first partition and a second partition related to each other based on the set of criteria, wherein the first partition and the second partition belong to a same system image, wherein the first partition is hosted on the first server, wherein the second partition is hosted on the second server, where the set of criteria is stored on the migration server;

code enabling a first determination, by the migration server, of a first average communication cost for the first partition and a second average communication cost for the second partition, wherein the first average communication cost is based on the first partition communicating with the set of related partitions, wherein the second average communication cost is based on the second partition communication with the set of related partitions;

code to select, by the migration server, the first partition over the second partition based on the first average communication cost being greater than the second average communication cost;

code enabling a second determination, by the migration server, based on the selecting, of a new location for the first partition in a hierarchical network tree, wherein the hierarchical network tree comprises a root node, a plurality of parent nodes dependent from the root node, and a plurality of children nodes dependent from the parent nodes, wherein the children nodes comprise the first server and the second server, wherein the second server comprises the new location, wherein each node of the hierarchical network tree represents a communication cost to that respective node, wherein each of the parent nodes aggregates a cost of all of the children nodes for that parent node, wherein the second determination comprises a traversal of the hierarchical network tree from the root node to the children nodes and a selection, based on the traversal, of a branch of the hierarchical network tree with a largest cost, wherein a parent node from the parent nodes comprises the cost which comprises the first average communication cost;

code to move, by the migration server, based on the hierarchical network tree, the first partition from the first server to the new location on the second server based on the second average communication cost being less than the first average communication cost such that the first partition and the second partition share the memory.

9. The computer program product of claim 8, in which the medium further comprises
code to calculate an average cost for communications between the first partition located on the first server and the second partition located on the second server; and
code to select, based on the average cost, the first partition for migration from the first server to the second server.

10. The computer program product of claim 9, in which the medium further comprises code to calculate a mean of communications costs between the first partition and each other partition of the plurality of partitions.

11. The computer program product of claim 10, in which the medium further comprises code to determine an input/output delay between the first partition and each of the other partitions of the plurality of partitions.

12. The computer program product of claim 8, in which the first server is a member of a first rack and the second server is a member of a second rack.

13. The computer program product of claim 12, in which the first server is a member of a first data center and the second server is a member of a second data center.

14. The computer program product of claim 8, in which the medium further comprises:
code to capture network traffic between the plurality of partitions;
code to store the captured network traffic in the network traffic log before analyzing the network traffic.

15. An apparatus, comprising:
a migration server comprising:
a memory; and
a processor coupled to the memory, in which the processor is configured:
to receive a network traffic log listing communications between a plurality of partitions spanning a first server and a second server, wherein the second server comprises a memory; and
to identify, from the network traffic log, a set of related partitions based on a set of criteria, wherein the plurality of partitions comprises the set of related partitions, wherein the set of related partitions comprises a first partition and a second partition related to each other based on the set of criteria, wherein the first partition and the second partition belong to a same system image, wherein the first partition is hosted on the first server, wherein the second partition is hosted on the second server, where the set of criteria is stored on the migration server;
to perform a first determination of a first average communication cost for the first partition and a second average communication cost for the second partition, wherein the first average communication cost is based on the first partition communicating with the set of related partitions, wherein the second average communication cost is based on the second partition communication with the set of related partitions;
to select the first partition over the second partition based on the first average communication cost being greater than the second average communication cost;
to perform a second determination, based on the selecting, of a new location for the first partition in a hierarchical network tree, wherein the hierarchical network tree comprises a root node, a plurality of parent nodes dependent from the root node, and a plurality of children nodes dependent from the parent nodes, wherein the children nodes comprise the first server and the second server, wherein the second server comprises the new location, wherein each node of the hierarchical network tree represents a communication cost to that respective node, wherein each of the parent nodes aggregates a cost of all of the children nodes for that parent node, wherein the second determination comprises a traversal of the hierarchical network tree from the root node to the children nodes and a selection, based on the traversal, of a branch of the hierarchical network tree with a largest cost, wherein a parent node from the parent nodes comprises the cost which comprises the first average communication cost;
to move, based on the hierarchical network tree, the first partition from the first server to the new location on the second server based on the second average communication cost being less than the first average communication cost such that the first partition and the second partition share the memory.

16. The apparatus of claim 15, in which the processor is further configured to calculate an average cost for communications between the first partition located on the first server and the second partition located on the second server; and to select, based on the average cost, the first partition for migration from the first server to the second server.

17. The apparatus of claim 16, in which the processor is further configured to calculate a mean of communications costs between the first partition and each other partition of the plurality of partitions.

18. The apparatus of claim 17, in which the processor is further configured to determine an input/output delay between the first partition and each of the other partitions of the plurality of partitions.

19. The apparatus of claim 15, in which the first server is a member of a first rack and the second server is a member of a second rack, and in which the first server is a member of a first data center and the second server is a member of a second data center.

20. The apparatus of claim 15, in which the apparatus further comprises a network adapter coupled to the processor, in which the processor is further configured:

to capture network traffic between the plurality of partitions; and to store the captured network traffic in the network traffic log before analyzing the network traffic.

* * * * *